Oct. 4, 1932.  J. C. WATTLEWORTH  1,880,554
REVERSING MECHANISM

Filed May 4, 1931

INVENTOR.
John C. Wattleworth
BY
Fay, Oberlin & Fay
ATTORNEYS.

Patented Oct. 4, 1932

1,880,554

UNITED STATES PATENT OFFICE

JOHN C. WATTLEWORTH, OF CLEVELAND, OHIO, ASSIGNOR TO LEE WHITRIGHT, OF LODI, OHIO

REVERSING MECHANISM

Application filed May 4, 1931. Serial No. 534,838.

The present invention relating as indicated to a reversing mechanism, has more particular reference to a novel type of construction for a forward and reverse drive unit adapted to be utilized in installations subject to heavy load conditions and where the device is subject to severe service in starting and stopping quickly. The present mechanism is particularly adaptable for use with gasoline engines where such engines are used in oil drilling operations and marine work and where quick reversals are constantly employed. It is also particularly adaptable for use with heavy machinery such as paper mill calenders, and the like, where it is often necessary to stop the calender and reverse it as quickly as possible due to breakage of the paper being calendered.

The general object and nature of my invention is to provide a simple and sturdy type of construction for such an above described unit, which shall possess the minimum number of moving parts as well as a type of friction elements which possess the characteristics of durability and absence of premature failure.

The device itself consists of an oil-proof housing in which is mounted the mechanism for obtaining a direct drive and reverse drive at engine speeds, together with the entire clutch mechanism. The clutch actuating mechanism consists of rocking gear segments which are forced into engagement with the clutch pressure plates by means of a ring member slidable along the outer longitudinally curved surfaces of such segments. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
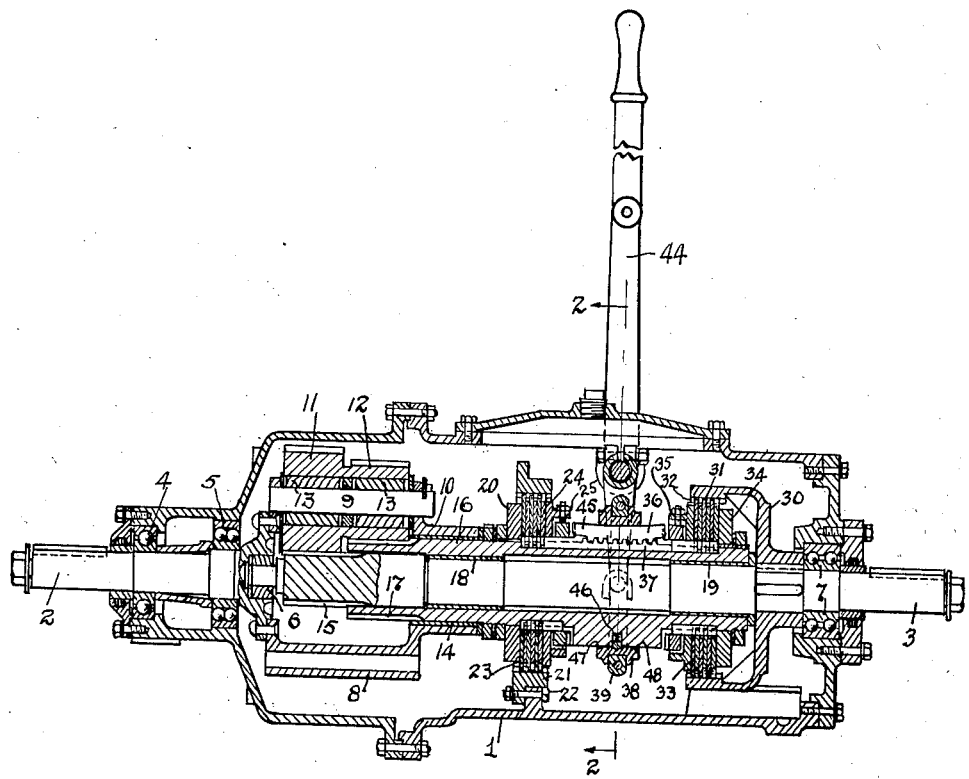
Figure 2:
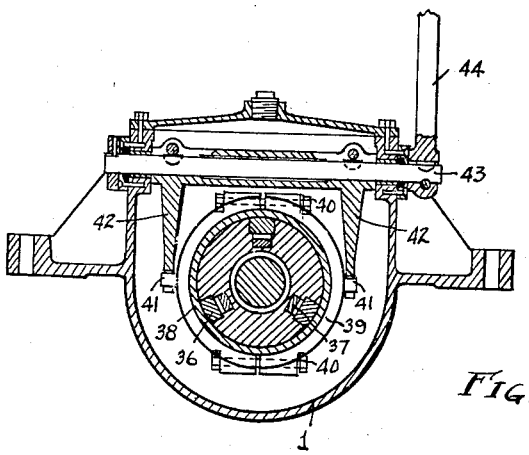

In said annexed drawing:

Fig. 1 is a longitudinal section through a unit embodying the principle of my invention; and Fig. 2 is a section taken substantially along the line 2—2 of Fig. 1, illustrating the construction of the clutch actuating means.

As illustrated, the device consists of an outer housing indicated generally at 1, enclosing the moving parts and having journaled therein at each end the driving shaft 2 and the driven shaft 3. In an alternative type of construction it may be desirable to enclose the engine flywheel within the clutch housing where the herein described reversing mechanism is dependently assembled with the power plant. In the accompanying drawing, however, I have shown the unit embodying the principle of my invention as simply connecting one power shaft to another.

The driving shaft 2 is suitably carried in a pair of bearings 4 and 5 mounted in the forward end of the housing 1. The driven shaft 3 is carried upon its forward end by the pilot bearing 6 and rearwardly by the main bearing 7. A gear casing 8 is secured to a flange upon the end of the driving shaft 2, and is adapted to rotate therewith. The gear casing 8 carries a number of fixed pins 9 which carry the epicyclic gears 11 and 12. Suitable roller bearings 13 are provided in order to decrease the frictional resistance of the gears 11 and 12 when rotating upon the pins 9. The rearward portion 10 of the gear casing 8 is rotatably supported by suitable anti-friction bearing 14. On the forward end of the driven shaft 3 there is the integrally cut gear 15 adapted to mesh with the epicyclic gear 11.

A rotatable sleeve 16 having a gear 17 cut upon its forward end is suitably mounted upon the driven shaft 3 by means of the bearings 18 and 19. The gear 17 meshes with the epicyclic gears 12.

Immovably secured to the sleeve 16 is the multiple disc clutch pressure plate 25 carrying the discs 23. The clutch discs 24 positioned between the driving plates 23 are, in turn, secured to the driven plate 21 which is fixed against rotation by means of the bolt 22 engaging with a suitable boss in the housing 1. The backing plate 20 serves to compensate for the force exerted by the pressure plate 25.

Integrally formed to the driven shaft 3 is the flange 30 having the cylindrical portion 31 carrying the multiple clutch discs 32. The clutch discs 32 are operably associated with the driving discs 33 which, in turn, are carried by and secured to the clutch pressure plate 35, and held in operable position on the sleeve 16 by means of the clutch backing plate 34.

In order to actuate the clutch plates 25 and 35 respectively, there are provided the gear segments 36 in mesh with complementary gear teeth 37 formed integrally upon the sleeve 16. The gear segments 36 have a longitudinally curved outer surface 45. A slidable actuating ring 38 is carried by the split ring 39. The halves of the latter ring 39 are secured in position by means of the bolts 40. Studs 41 extending from the split ring 39 are engaged by the yoke members 42 which are, in turn, keyed to the rock shaft 43. A suitable manual actuating lever 44 is adapted to actuate the rock shaft 43. It will thus be seen that movement of the rock shaft 43 will result in longitudinal movement of the gear segments 36 in relation to the sleeve 16 with the result that the ends of the segments 36 will abut against the pressure plates 25 and 35 and the latter will be forced against their respective clutch plates in order to produce frictional engagement of the multiple disc clutches.

In order to retain the clutch actuating mechanism in locked engagement in its three positions of forward, reverse and neutral, there is provided the spring mounted detent 46 which is adapted to engage with the beveled surfaces 47 and 48 upon the sliding ring 38.

The operation of the mechanism is as follows: when the segment actuating ring 38 is in neutral position as shown in Fig. 1, neither one of the plates 25 or 35 will be in engagement. Therefore the sleeve 16 will be free to rotate upon the shaft 3 and the epicyclic gears 11 and 12 will walk around their respective concentric gears with the result that no transfer of torque will occur through the mechanism. When the segment actuating means 45 is moved toward the left, the left hand or reversing clutch will be thrown into frictional engagement with the result that the rotatable sleeve 16 will be locked against any rotation whatsoever and the torque from the driving shaft 2 will be transferred through the epicyclic gear train to the gear 15 of the driven shaft 3, tending to drive the latter in a direction opposite to that of the driving shaft 2. When the segment actuating means 45 is moved in a right hand direction, the clutch 34 will be thrown into frictional engagement with the result that the sleeve 16 will be locked against rotation in relation to the driven shaft 3, in which instance the sleeve, the gear train, the driving shaft 2, and the driven shaft 3 revolve as a unit. It will thus be seen that when the actuating mechanism is in such a position that neither of the two clutches are in engagement, that the device is then in neutral position and there will occur no torque transfer. When the left hand clutch is actuated, the right hand clutch is correspondingly thrown out of engagement and the device will then operate to transfer torque in a reverse direction. Similarly engagement of the right hand clutch results in disengagement of the left hand or reversing clutch and a corresponding direct or forward drive.

Thus it will be seen that in the case of a change from reverse to forward rotation and since the sleeve 16 has been locked against rotation that the clutch 34 is subjected only to the load of taking up frictional velocity from zero to that of the driving shaft. That is, half as much as would be required when necessary to transfer torque from full power reverse to dead load and from dead load to full power forward, and conversely, on changing from forward to reverse, the sleeve 16 changes rotational velocity from forward to zero only. Hence all that the reverse clutch has to take up is the frictional resistance corresponding to such a velocity change. Although the reverse clutch 20 has been generally described as "clutch", it is in the more strict sense of the term a "brake" since it operates to retard the rotational movement of the sleeve 16.

The present clutch and reverse mechanism provide a simple, extremely sturdy structure with a minimum of operating parts, and it will be noted that the only gears which are employed are a series of double gears carried on shafts which are supported at both ends. These shafts have no rotating movement, the gears being carried on suitable bearings on the shafts, and thus there is a minimum amount of wear possible and the gears are always in alignment and, of course, mesh with integrally formed gears on the driving shaft and sleeve. The main driving shaft is supported at both ends and the sleeve likewise supported by suitable bearings carried on the driving shaft. By the use of multiple disc clutches in an oil-tight case, the clutches may be moved into positive locking engagement with a minimum of wear and the device may be thrown from its driving to its reverse position without having to engage any gears or like members, the disc clutches themselves being able to take the necessary slippage to bring the device to a stop and to change the direction of drive of the main shaft without wear or breakage. It is, of course, obvious that the device can be attached to any driven member or flange to which the gear box can be attached.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In actuating mechanism for a pair of disc clutches each having a pressure ring, the combination of a rack member mounted against longitudinal movement, a gear segment in mesh therewith and capable of rocking movement in both directions to bear against said pressure rings, and operating means for rocking said segment in either direction and for holding the segment in locked position.

2. In actuating mechanism for a pair of disc clutches each having a pressure ring, the combination of a rack member mounted against longitudinal movement, a gear segment in mesh therewith and capable of rocking movement in both directions to bear against said pressure rings, said segment having a longitudinally curved outer surface, and operating means consisting of a movable ring adapted to bear against said outer surface of the segment to force it into engagement with either of said pressure rings.

3. In actuating mechanism for a pair of clutches mounted on a sleeve, each clutch having a pressure operating ring, the combination of a series of rack members mounted against longitudinal movement on said sleeve between said clutches, a complementary series of gear segments in engagement with said racks and adapted to be rocked into engagement with said pressure rings, and means for rocking said segments in either direction to actuate said clutches, said means being adapted to maintain itself in clutch engaging position.

4. In actuating mechanism for a pair of clutches mounted on a sleeve, each clutch having a pressure operating ring, the combination of a series of rack members mounted against longitudinal movement on said sleeve between said clutches, a complementary series of gear segments in engagement with said racks and adapted to be rocked into engagement with said pressure rings, the outer surfaces of said segments having a longitudinal curvature, and a movable operating cylinder mounted around said segments and slidable therealong to rock the same into clutch engaging position, and means associated with said cylinder to hold said clutch against disengagement.

5. In a forward and reverse mechanism, the combination of a casing, a power shaft, a driven shaft, a sleeve rotatably mounted on said driven shaft, reversing gearing between said shaft and sleeve, a disc clutch for releasably locking said sleeve against rotation, and another disc clutch for releasably connecting said sleeve to said driven shaft, and means mounted on said sleeve for actuating said clutches.

6. In a forward and reverse mechanism, the combination of a casing, a power shaft, a driven shaft, a sleeve rotatably mounted on said driven shaft, reversing gearing between said shaft and sleeve, and a pair of disc clutches mounted on said sleeve and adapted to control said reversing gearing, and means mounted on said sleeve for actuating said clutches, said means consisting of a series of racks secured to said sleeve and a complementary series of engaging gear segments with means for rocking said segment into engagement with said clutches.

Signed by me this 27th day of April, 1931.

JOHN C. WATTLEWORTH.